United States Patent
Watson et al.

(10) Patent No.: US 10,067,794 B1
(45) Date of Patent: Sep. 4, 2018

(54) COMPUTER-EXECUTABLE METHOD, SYSTEM, AND COMPUTER PROGRAM PRODUCT FOR BALANCED PORT PROVISIONING USING FILTERING IN A DATA STORAGE SYSTEM

(71) Applicant: EMC Corporation, Hopkinton, MA (US)

(72) Inventors: Thomas L. Watson, Richardson, TX (US); Anoop G. Ninan, Milford, MA (US); Ameer Jabbar, Lilburn, GA (US); Hala El-Ali, Murphy, TX (US)

(73) Assignee: EMC Ip Holding Company LLC, Hopkinton, MA (US)

( * ) Notice: Subject to any disclaimer, the term of this patent is extended or adjusted under 35 U.S.C. 154(b) by 283 days.

(21) Appl. No.: 13/886,789

(22) Filed: May 3, 2013

(51) Int. Cl.
    G06F 9/46      (2006.01)
    G06F 9/455     (2018.01)
    G06F 9/50      (2006.01)

(52) U.S. Cl.
    CPC ............ G06F 9/5011 (2013.01); *G06F 9/505* (2013.01); *G06F 9/5044* (2013.01)

(58) Field of Classification Search
    None
    See application file for complete search history.

(56) References Cited

U.S. PATENT DOCUMENTS

| | | | |
|---|---|---|---|
| 5,210,871 A * | 5/1993 | Lala | G06F 9/52 710/116 |
| 6,799,255 B1 * | 9/2004 | Blumenau et al. | 711/152 |
| 2006/0020691 A1 * | 1/2006 | Patterson et al. | 709/223 |
| 2006/0253549 A1 * | 11/2006 | Arakawa et al. | 709/217 |
| 2007/0083657 A1 * | 4/2007 | Blumenau et al. | 709/226 |
| 2008/0082983 A1 * | 4/2008 | Groetzner | G06F 9/5083 718/105 |
| 2009/0025007 A1 * | 1/2009 | Hara et al. | 718/105 |
| 2009/0109841 A1 * | 4/2009 | Nozaki | H04L 45/00 370/218 |
| 2010/0229033 A1 * | 9/2010 | Maeda | G06F 11/1076 714/6.32 |
| 2012/0163174 A1 * | 6/2012 | Shukla et al. | 370/235 |
| 2012/0210334 A1 * | 8/2012 | Sutedja | G06Q 10/107 719/314 |

* cited by examiner

*Primary Examiner* — Bradley Teets
(74) *Attorney, Agent, or Firm* — Krishnendu Gupta; Konrad Lee

(57) ABSTRACT

A method, system, and computer program product for allocating one or more available ports on a data storage system, the data storage system having one or more data storage volumes, to enable communication with the one or more data storage volumes on the data storage system, the method, system, and computer program comprising filtering the one or more available ports on the data storage system to determine a balanced allocation of a port of the one or more available ports through one or more storage components on the data storage system, and allocating the port to the data storage volume thereby enabling access to the data storage volume through the one or more storage components.

15 Claims, 10 Drawing Sheets

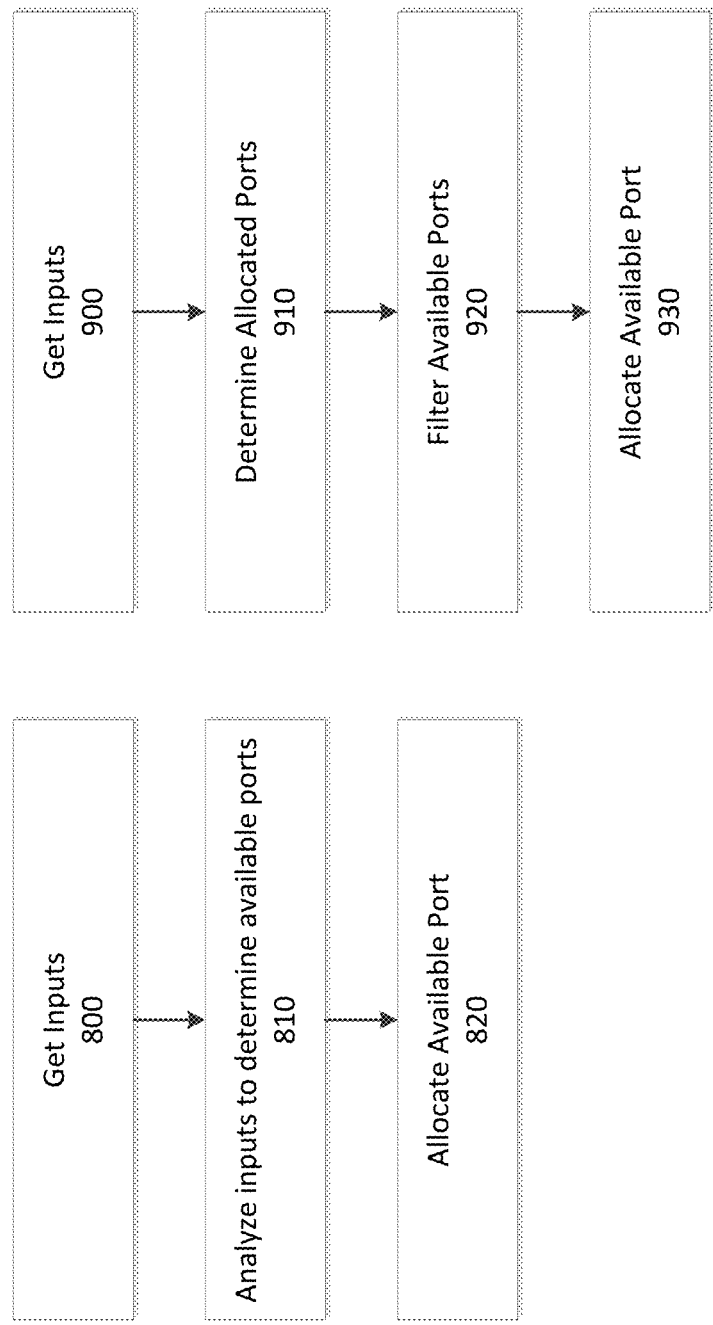

COMPUTER-EXECUTABLE METHOD, SYSTEM, AND COMPUTER PROGRAM PRODUCT FOR BALANCED PORT PROVISIONING USING FILTERING IN A DATA STORAGE SYSTEM

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

CROSS REFERENCE TO RELATED APPLICATIONS

This Application is related to U.S. patent application Ser. No. 13/630,455 entitled "SINGLE CONTROL PATH" filed on Sep. 28, 2012, Ser. No. 13/631,030 entitled "METHOD AND APPARATUS FOR FEDERATING A PLURALITY OF ONE BIG ARRAYS" filed on Sep. 28, 2012, Ser. No. 13/631,039 entitled "METHOD AND APPARATUS FOR AUTOMATED INFORMATION LIFECYCLE MANAGEMENT USING A FEDERATION OF ARRAYS" filed on Sep. 28, 2012, Ser. No. 13/631,055 entitled "METHOD AND APPARATUS FOR FEDERATED IDENTITY AND AUTHENTICATION SERVICES" filed on Sep. 28, 2012, Ser. No. 13/631,190 entitled "APPLICATION PROGRAMMING INTERFACE" filed on Sep. 28, 2012, Ser. No. 13/631,214 entitled "AUTOMATED POLICY BASED SCHEDULING AND PLACEMENT OF STORAGE RESOURCES" filed on Sep. 28, 2012, Ser. No. 13/631,246 entitled "DISTRIBUTED SYSTEM SOFTWARE INFRASTRUCTURE" filed on Sep. 28, 2012, and Ser. No. 13/886,786 entitled "DISTRIBUTED WORKFLOW MANAGER" Ser. No. 13/886,892 entitled "SCALABLE INDEX STORE", Ser. No. 13/886,915 entitled "SCALABLE OBJECT STORE" Ser. No. 13/886,687 entitled "STORAGE PROVISIONING IN A DATA STORAGE ENVIRONMENT", and Ser. No. 13/886,644 entitled "STORAGE PROVISIONING IN A DATA STORAGE ENVIRONMENT" filed on even date herewith, the teachings of which applications are hereby incorporated herein by reference in their entirety.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A method, system, and computer program product for allocating one or more available ports on a data storage system, the data storage system having one or more data storage volumes, to enable communication with the one or more data storage volumes on the data storage system, the method, system, and computer program comprising filtering the one or more available ports on the data storage system to determine a balanced allocation of a port of the one or more available ports through one or more storage components on the data storage system, and allocating the port to the data storage volume thereby enabling access to the data storage volume through the one or more storage components.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 8 is an example embodiment of a method of provisioning ports to enable a host to communicate with a data storage volume using a port provisioning system, in accordance with an embodiment of the present disclosure;

FIG. 9 is an alternate example embodiment of a method of provisioning ports to enable a host to communicate with a data storage volume using a port provisioning system, in accordance with an embodiment of the present disclosure;

Like reference symbols in the various drawings indicate like elements.

DETAILED DESCRIPTION

Figure 1:
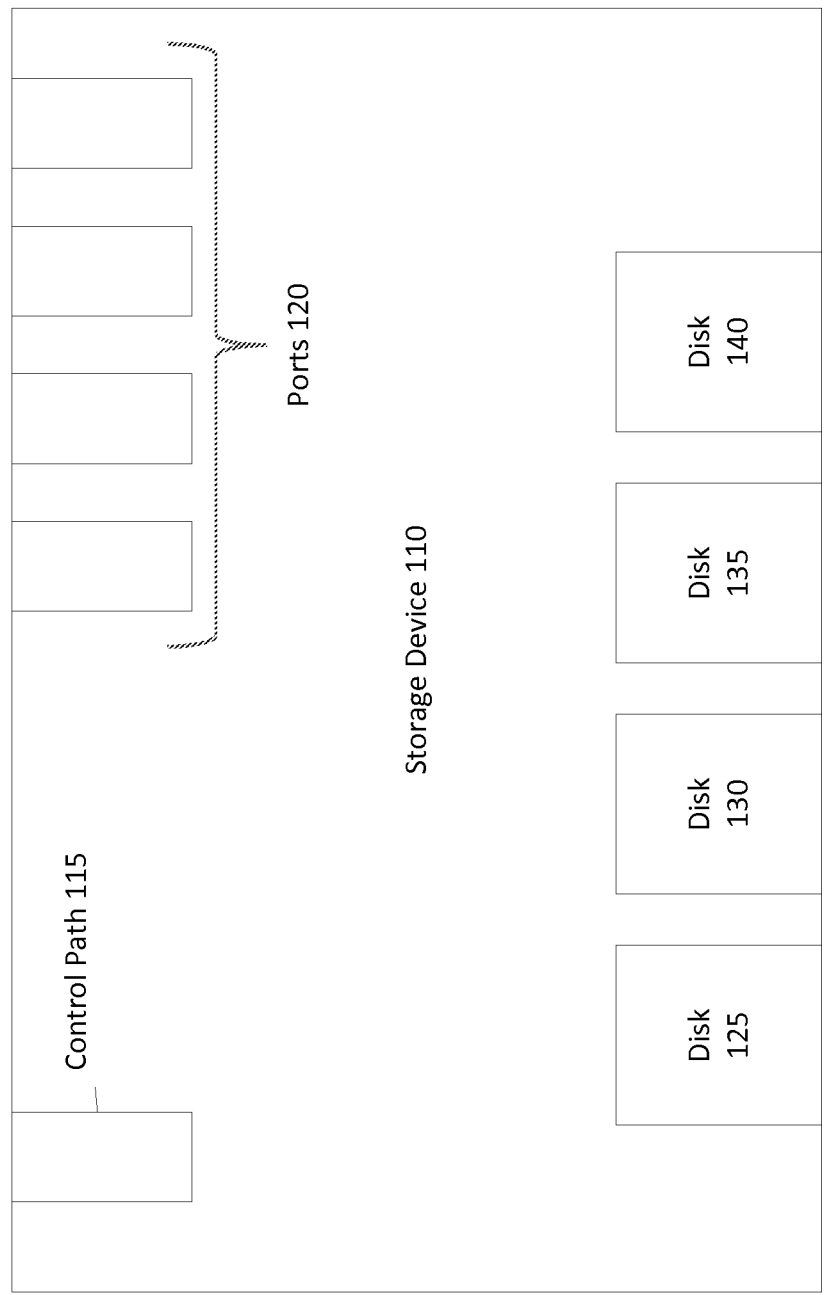
FIG. 1 is a simplified illustration of a data storage device, in accordance with an embodiment of the present disclosure.

Typically, provisioning of one or more data services in a data storage system may require a multitude of steps. Generally, provisioning of a data service may require an administrator and/or a user to manually allocate one or more ports to enable a host to communicate with a data storage volume in a data storage system. Traditionally, quickly provisioning ports in a balanced distribution across each component may not have been possible.

In certain embodiments, the current disclosure may enable a distributed software control platform that allows enterprise IT departments and cloud service providers to convert heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multi-tenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as a single storage array. In further embodiments, the current disclosure may enable a data storage system to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through a data management software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMware® and OpenStack™.

In certain embodiments, the following definitions may be useful:

A data service may be a service for receiving, processing, storing, and protecting data. In certain embodiments, data services provide the high-level data and storage management capabilities of the system.

A control path may be a way to establish and control access to the data.

A data path may be the path the data takes from data storage provider to data storage consumer.

A storage medium may be any medium that is capable of storing data, including, but not limited to a storage array, a storage cluster, a physical disk, a virtual disk, and a virtual storage system.

A tenant may represent an organization operating within a data storage system. In some embodiments, a tenant may be created in the system for the purposes of security isolation.

A neighborhood may represent a fault domain within a network. In many embodiments, a plurality of data centers may be combined to create a federation. In some embodiments, the federation failures may occur that may affect the availability of resources. In certain embodiments, the data centers or federation may account for the failures by segmenting the infrastructure into different fault domains. In some embodiments, each fault domain may be designed to be isolated from other fault domains, while part of the same data center, so that each failure within one fault domain does not affect other fault domains.

A transport zone may represent a region of connectivity within a neighborhood. In many embodiments, a transport zone may include a network, such as a SAN network or an IP network. In various embodiments, a transport zone may include addresses (such as a World Wide Names (WWN) that may be in the network for both hosts and storage array ports. In some embodiments, addresses for hosts may include initiator addresses and/or IP addresses. In certain embodiments, a data storage system may be enabled to determine what initiators may be connected to what storage ports by analyzing a transport zone.

An initiator may be an address used in the SAN networking. In many embodiments, an initiator may include a Fiber Channel (FC) initiator and/or an iSCSI initiator. In various embodiments, FC initiators may use a WWN address as a unique identifier in a data storage system. In various embodiments, a WWN may include a port address and/or node address. In certain embodiments, an iSCSI initiator may include addresses of type IQN and EUI.

An engine may be a hardware unit within a Symmetrix Array. In various embodiments, a VMAX system may include eight engines, where each engine may include two directors.

A director may be a hardware unit within a Symmetrix Array, on an engine. In some embodiment, each director may include one or more ports.

A project may be a resource organization abstraction that maps resources to applications, virtual data centers, departments, or other entities. In some embodiments, a user may create their own projects, and may associate multiple resources from different data services with the projects. In most embodiments, resources from one project maybe shared between users under the same tenant.

A Class of Service may represent high-level capabilities and services that may be created by administrators through composition of resource attributes and quality of services, including level of protection, availability, access protocol, performance, and additional storage/data services, such as versioning/snap, backup, remote replication, data reduction, encryption, and/or other data storage services. In many embodiments, users or tenants may select from a menu of Class of Service entries when creating a volume.

Generally, a data storage array or system may be one or more physical boxes or a cluster of physical boxes. In conventional systems, the data storage array or system may have one control path and one or more data paths. In typical systems, one or more data paths ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Refer, now to the example embodiment of FIG. 1 which illustrates a sample storage device. Storage device 110 has control path 115, ports 120, and disks 125, 130, and 135. Control path 115 enables a user to interface with storage device 110. Control path 115 enables a user to access disks 125, 130, and 135, via the services storage device 110 offers, through one or more of ports 120.

In many embodiments, the current disclosure may enable allocation of storage ports for exporting volumes from storage arrays in a data storage system. In various embodiments, the current disclosure may eliminate the need for an administrator to manually allocate each storage port. In some embodiments, the current disclosure may maximize hardware redundancy between selected allocated paths by applying prioritized filtering of the candidate ports based on their hardware redundancy information. In certain embodiments, an arbitrary number of filters may be applied according to importance. For example, in an embodiment, a higher importance filter may be applied before a lower importance filter. In many embodiments, the current disclosure may enable automatic allocation of storage ports in one or more configurations. In various embodiments, the current disclosure may enable balanced usage and/or allocation of ports from a data storage array. In some embodiments, the current disclosure may enable randomized port allocation over time, such that the bandwidth consumed by each port may be approximately equal.

In many embodiments, the current disclosure may enable optimized port selection for maximum redundancy which may consider both the data storage system, which may include the data storage array and the SAN fabric. In various embodiments, the current disclosure may enable load balancing across one or more data storage ports within a data storage system. In certain embodiments, the current disclosure may enable a user or administrator to dedicate one or more data storage ports for specific uses, such as a specified export group or project.

In many embodiments, the current disclosure may enable a port provisioning system to be implemented within a data storage system to enable allocation of storage ports for exporting volumes from storage arrays in a data storage system. In various embodiments, the port provisioning system may automatically adapt to a given configuration (i.e., a configuration which may include one or more SAN switches, one or more directors, one or more engines, one or more initiators, and/or one or more ports.) In certain embodiments, the port provisioning system may automatically adapt to one or more network topologies. In some embodiments, a port provisioning system may be enabled to work with odd numbering of hardware, such as three directors, and may enable cycling through each director before reuse. In certain embodiments, the port provisioning system may allocate up to all ports that are available, across all switches, directors, and engines. In other embodiments, the port provisioning system may work well with symmetric configurations, such as two engines, each containing two directors, each connected to two SAN Switches.

In many embodiments, an automated provisioning system for storage arrays may be needed to pick and/or allocate storage ports on a storage array within a data storage system. In various embodiments, an automated provisioning system may be enabled to mask one or more ports to an export group, such that the ports may be used to access one or more desired storage volumes within the data storage system. In some embodiments, zones may be created on a SAN switch which may allow a host to access storage array ports through the SAN fabric. In many embodiments, a storage port selection algorithm may take several considerations into account to optimize high availability, provide required bandwidth to the volume(s) by allocating a proportionate number of ports and to balance the load across the available storage ports.

In various embodiments, a data storage system may include one or more internal constructs and hardware to facilitate giving access to one or more volumes to one or more hosts. In certain embodiments, the one or more internal constructs and hardware may include switches, SAN switches, initiators, directors, engines, and/or storage ports. In many embodiments, a data storage system may include one or more data storage arrays which may be enabled to connect to one or more hosts. In some embodiments, one or more data volumes maybe allocated from one or more data storage arrays for one or more hosts. In other embodiments, a host may have one or more initiators having one or more ports enabled to connect a data storage volume. In many embodiments, a host initiator port may connect to a switch which may enable communication with a data storage volume on a data storage array in a data storage system. In various embodiments, each data storage array may enable access to a data storage volume through one or more ports. In some embodiments, a data storage array may include one or more engines, wherein each engine may include one or more directors. In certain embodiments, each director may include one or more ports which may enable access to one or more data volumes on a data storage array within a data storage system. In other embodiments, a data storage system may use other constructs and hardware to facilitate communication with data volumes within a data storage system.

In many embodiments, a port provisioning system may utilize one or more inputs to determine which ports are selected within a data storage system and allocated to a host. In some embodiments, a port provisioning system may receive Tenant Data, Administrative Data, and/or System Calculated Data. In various embodiments, Tenant Data may include data pertaining to one or more hosts requesting data services from the data storage system. In some embodiments, Tenant Data may include the number of initiators on a host. In certain embodiments, Tenant Data may include the port and node name of each host initiator. In an embodiment, the node name may include a worldwide name (WWN) of a node. In some embodiments, Tenant Data may include an iSCSI IQN or EUI address of a host initiator. In many embodiments, Tenant Data may include a specified Class of Service. In some embodiments, a Class of Service may include and/or imply a num_path value in the data storage system. In various embodiments, the num_path variable may represent the number of paths from a host initiator to each volume within a data storage system.

In many embodiments, administrative data may include storage port registration status. In various embodiments, storage port registration status may specify which storage ports may be used by the data storage system. In certain embodiments, administrative data may include whether zoning may be enabled. In some embodiment, a data storage system may include one or more neighborhoods. In other embodiments, the current disclosure may enable a data storage system to automatically create connectivity when storage volumes are exported or exposed for consumption. In certain embodiments, automatic zoning of the SAN fabric, i.e. network connectivity of certain components, when storage volumes are exported within a neighborhood may be performed.

In many embodiments, a data storage system may calculate system data which may be used by the port provisioning system. In various embodiments, system data may include and identify relevant transport zones, neighborhoods, candidate storage ports, redundancy groups, host connected switches, storage connected switches, and/or initiator-target communication ability. In certain embodiments, each host initiator may identify a transport zone connected to a data storage system. In various embodiments, each transport zone may be equivalent to a fiber channel fabric, a VSAN, an IP network, or other network type. In some embodiments, a transport zone may identify a set of potential host initiators and storage ports that may be zoned together enabling communication between them.

In many embodiments, each volume within a data storage system may identify and/or reside within a neighborhood in the data storage system. In various embodiments, a neighborhood may define a data center boundary within a data storage system. In certain embodiments, each transport zone may be contained within a specific neighborhood in a data storage system.

In other embodiments, each transport zone that may be used may identify a candidate set of storage ports and initiators within each respective transport zone that may be used together. In certain embodiments, a data storage system may determine a candidate set of storage ports based on storage ports that a system administrator registered in a given transport zone. In various embodiments, one or more data storage volumes may be connected to one or more hosts where the host initiators are in the same transport zone as the storage ports associated with the one or more data storage volumes. In various embodiments, a port provisioning system may use a candidate set of storage ports to export one or more data storage volumes to a host through a specified transport zone. In some embodiments, a host may be enabled to communicate with multiple transport zones, for example a host may have a first initiator in a first transport zone and a second initiator in a second transport zone. In various embodiments, a host may be enabled to communicate through two or more transport zones which may enable hardware redundancy when creating data paths from the host to the one or more data storage volumes.

In many embodiments, a data storage system may include one or more redundancy groups which may give the data storage system knowledge of hardware redundancy within the data storage system. In various embodiments, storage ports on a data storage system may be divided into one or more redundancy groups based on whether each port is implemented by separate hardware components. In some embodiments, storage ports in the same redundancy group may share components making these ports more likely to fail together. In other embodiments, redundancy groups may group ports by Engine, Director, slot number used, storage port name, and/or other storage port identifiers. In various embodiments, one or more redundancy groups may be used by the port provisioning system to enable allocation of ports in a manner to ensure that a one or more failures within a data storage system may not affect an overall stability and/or overall functionality of the data storage system. In other embodiments, one or more redundancy groups may be used by the port provisioning system to enable allocation of ports in a manner to ensure that a one or more failures within a data storage system may not affect the ability of a host to access a data storage volume from the data storage system.

In many embodiments, system data may include information on switch and communication availability between each host and data volumes allocated for each host. In some embodiments, system data may include each switch a host may be connected to. In certain embodiments, each host initiator may identify a SAN switch that is directly connected to the host. In other embodiments, system data may include each switch a storage port on a storage array may be connected to. In various embodiments, each candidate storage port may identify a switch that is directly connected to a storage port on a storage array. In many embodiments, system data may include information pertaining to initiator-target communication ability. In various embodiments, the existence of an initiator name and a target name in the same network or a network's database entries may indicate that the initiator and target may be able to communicate with each other.

In many embodiments, the current disclosure may enable a data storage system to allocate one or more ports for a single fiber channel and/or iSCSI transport zone using a port provisioning system. In various embodiments, if ports for multiple transport zones may be selected, a data storage system may use a port provisioning system to analyze each transport zone individually. In some embodiments, a port provisioning system may receive one or more inputs to make a determination of an efficient port allocation for a host utilizing data services in a data storage system. In certain embodiments, a port provisioning system may use tenant provided data, administrator provided data, and/or system calculated data.

In many embodiments, a port provisioning system may use tenant provided data, administrator provided data, and/or system calculated data to facilitate port allocation. In various embodiments, a port provisioning system may utilize one or more steps to determine an efficient allocation of ports for a data storage system. In some embodiments, a port provisioning system may enable a balanced allocation of storage ports throughout a data storage system. In various embodiments, a balanced allocation of storage ports may include a data storage system where each hardware component may allocate a similar number of storage ports across each hardware component. For example, in an embodiment, a data storage system allocating four ports through two engines would allocate two ports on each engine in the data storage system. In some embodiments, a balanced allocation of storage ports may mean an equal, or as close to equal, distribution of storage ports across each hardware component within the data storage system. In certain embodiments, a port provisioning system may be enabled to allocate storage ports based on one or more criteria. In many embodiments, a data storage system may include a data storage array including one or more data storage ports. In various embodiments, a data storage system may include a data storage array including one or more engines having one or more directors, having one or more data storage ports. In many embodiments, a port provisioning system may be enabled to create a balanced allocation of data storage ports based on the configuration of the data storage system. In various embodiments, a port provisioning system may be enabled to create a balanced allocation of data storage ports based on one or more levels of hardware components having data storage ports.

In many embodiments, a port provisioning service may determine available storage ports within a data storage system. In certain embodiments, a port provisioning system may verify that each available storage port is available through switches connected to a data storage system. In other embodiments, if a storage port is not available through a switch connected to a data storage system, a port provisioning system may remove the port from the list of available storage ports within the data storage system.

In some embodiments, a port provisioning system may be configured to balance ports across each hardware component type within a data storage system. In some embodiments, hardware may include one or more switches, one or more engines, one or more directors, or one or more ports. In certain embodiments, as a port provisioning system allocates ports, the port provisioning system may eliminate each piece of hardware used until all available hardware has been used.

In many embodiments, a port provisioning system may utilize one or more algorithms to analyze a data storage system and filter available data storage ports to determine a balanced and/or equal usage of ports across a given data storage system. In various embodiments, a port provisioning system may query a data system to determine which switches are available and which ports are connected to each available switch. In some embodiments, if a port is not currently connected to a switch, the port may be eliminated from the list of available ports. In certain embodiments, a port provisioning system may keep track of allocated ports, allocated engines, allocated directors, and/or allocated switches used while allocating ports to enable port provisioning system to allocate ports to maximize redundancy across each engine, director, and/or switch rather than allocating each port on a single entity.

In some embodiments, a port provisioning system may be enabled to allocate one or more available ports by filtering the available ports to enable a determination of a balanced and/or equal distribution of ports across each engine, director, and/or switch. In various embodiments, one or more filters may be applied in a precedence order from most important to least important consideration. In certain embodiments, the number of filters used may be adjusted. In many embodiments, a port provisioning system may use one or more filters, where each filter may operate on a data storage system entity, such as a VMAX engine, VMAX director, VNX processor, SAN switch, and/or other data storage system component. In some embodiments, each filter may require inputs, including: a current list of candidate ports, the filtering entities that have already been allocated or used, and a map from the contextual object that contains entries of an entity based on a key to the set of storage ports hosted by or associated with the entity. In many embodiments, as a port provisioning system starts allocating ports, each of the filters may have no allocated entities. In some embodiments, as the port provisioning system allocates ports, the port provisioning system includes the entities, from where the port was allocated, into its respective filter. In certain embodiments, the port provisioning system may continue to allocate ports while continually filtering out available ports using the specified filters. In some embodiments, once all entities are contained within each specified filter and no ports are available, each filter may be purged and the process repeated until each requested port may be allocated.

Figure 2:
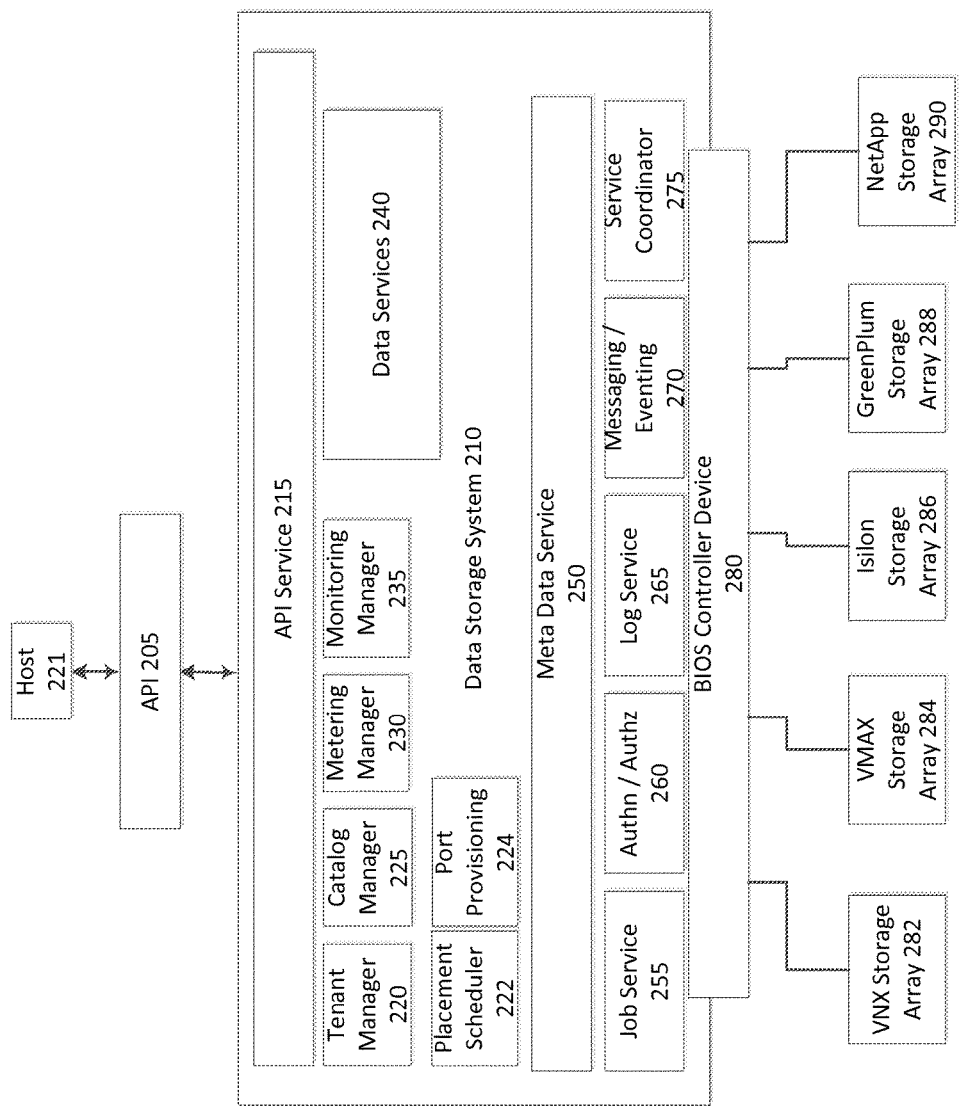
FIG. 2 is a simplified illustration of a data storage system, in accordance with an embodiment of the present disclosure.

Refer now to the example embodiment of FIG. 2. FIG. 2 is a simplified illustration of a one big array, in accordance with an embodiment of the present disclosure. As shown in FIG. 2, API Service 215 enables external access to Host 221 through API 205. API Service 215 communicates requests to One Big Array 210. API Service 215 enables access to Service Coordinator 275, which enables access to other services and management modules. Through Service Coordinator 275, API Service 215 has access to tenant manager 220, catalog manager 225, metering manager 230, monitoring manager 235, data services 240, meta data service 250, job service 255, authn/authz 260, log service 265, messaging/eventing 270, port provisioning 224, placement scheduler 222, and BIOS Controller Device 280. As shown, port provisioning 224 allocates data storage ports from data storage volumes allocated from attached data storage. In this embodiment, attached data storage includes VNX storage array 282, vmax storage array 284, Isilon storage array 286, greenplum storage array 288, and netapp storage array 290.

Figure 3:
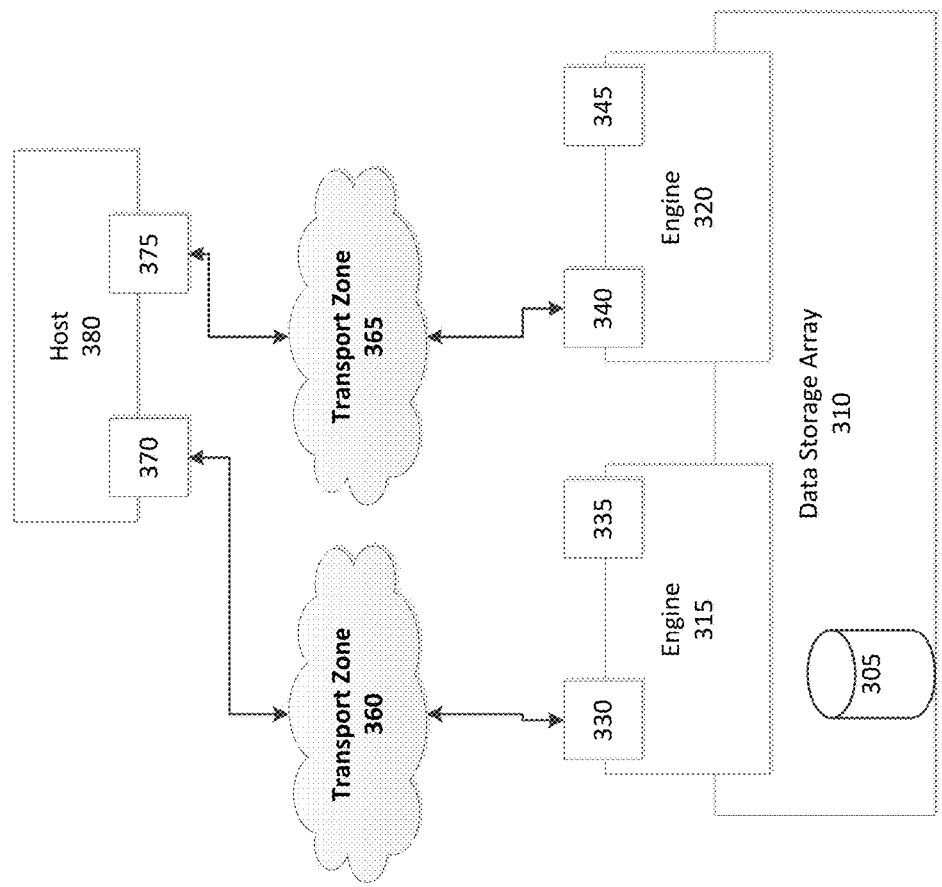
FIG. 3 is a simplified illustration of how a host communicates with a data storage volume, in accordance with an embodiment of the present disclosure.

Refer now to the example embodiment of FIG. 3. FIG. 3 is a simplified illustration of how a host communicates with a data storage volume, in accordance with an embodiment of the present disclosure. As shown, data storage volume 305 has been allocated from a data storage pool from data storage array 310 to host 380. In this embodiment, Host 380 has initiator 370 and initiator 375, where each initiator includes four ports. Data storage Array 310 has engine 315 and engine 320. Engine 315 has director 330 and director 335. Engine 320 has director 340 and director 345. Each of the directors 330, 335, 340, 345 has four ports. As shown, host 380 is connected to data volume 305 through two data paths. A first data path is created from initiator 370 to transport zone 360 to director 330. A second data path is created from initiator 375 to transport zone 365 to director 340. In this embodiment, the first data path and second data path provides redundancy for Host 380. Host 380 is enabled to access data volume 305 using the first data path or the second data path.

Figure 4:
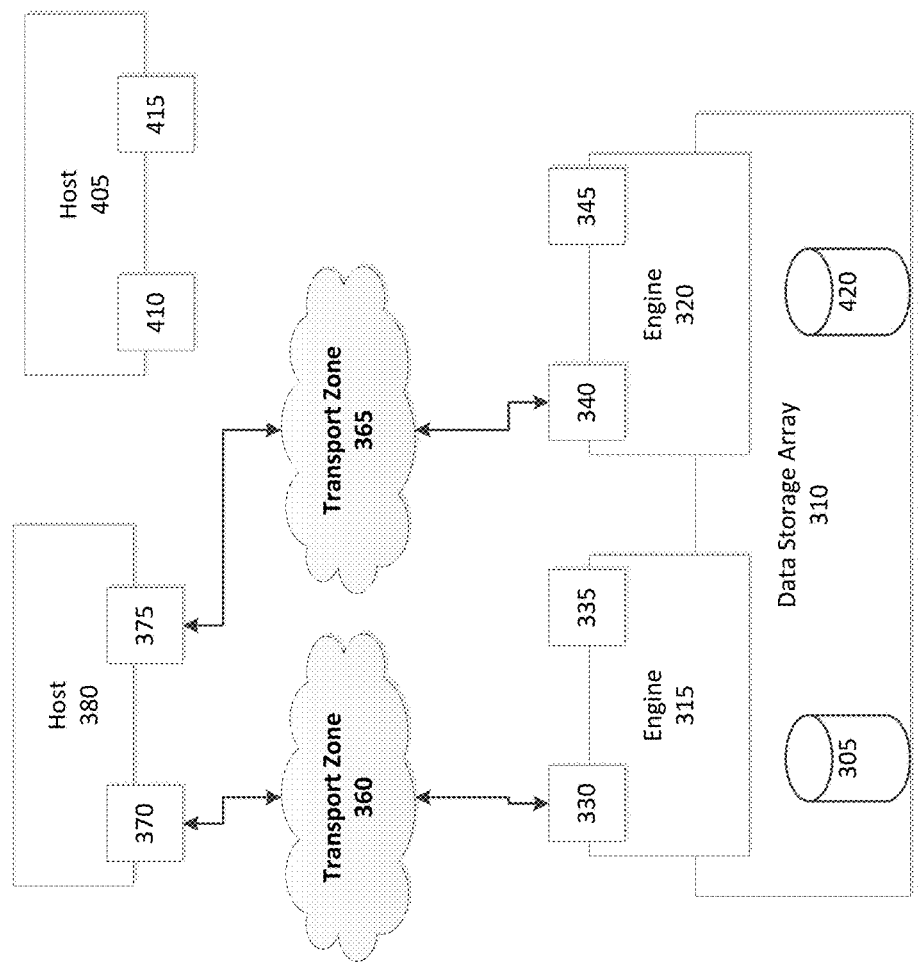
FIG. 4 is a simplified illustration of two hosts attempting to communicate with two data storage volumes, in accordance with an embodiment of the present disclosure.

Refer now to the example embodiment of FIG. 4. FIG. 4 is a simplified illustration of two hosts attempting to communicate with two data storage volumes, in accordance with an embodiment of the present disclosure. As shown, data storage volume 305 is allocated from data storage array 310 for host 380. In this embodiment, port provisioning system 224 (FIG. 2) has allocated ports for Host 380 enabling two data paths by which Host 380 is enabled to communicate with data storage volume 305. In this embodiment, data storage volume 420 is allocated from data storage array 310 for host 405. In FIG. 4, similar to Host 380, Host 405 includes initiator 410 and initiator 415. As shown, port provisioning system 224 (FIG. 2) has not yet allocated a port to enable Host 405 to access data storage volume 420.

Figure 5:
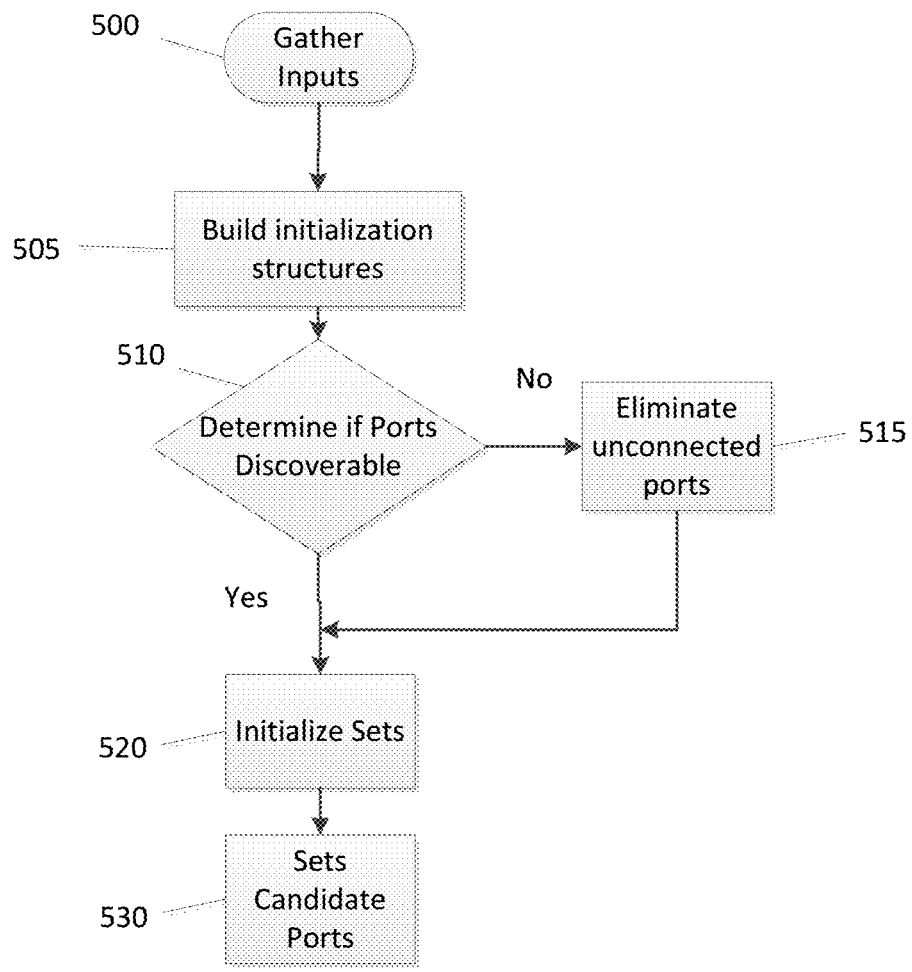
FIG. 5 is a simplified flowchart of a method of initializing a port provisioning system, in accordance with an embodiment of the present disclosure.

Refer now to the example embodiments of FIGS. 2 and 5. FIG. 5 is a simplified flowchart of a method of initializing a port provisioning system, as shown in FIG. 2, in accordance with an embodiment of the present disclosure. As shown, port provisioning system 224 gathers inputs (Step 500) from data storage system 210 regarding the configuration of the data storage system 210, configuration of host 221, and availability of ports within data storage system 210. In many embodiments, gathered inputs may include the number of storage ports to be allocated per transport zone, which may be derived from the Class of Services num_paths variable. In some embodiments, when the num_paths variable is not defined, a default of two may be provided. Port provisioning system 224 builds initialization structures (Step 505) from the gathered inputs.

In many embodiments, an initialization structure may include one or more pointers to one or more transport zones. In various embodiments, an initialization structure may include a map of the available storage ports, where the keys are the port WWPNs or iSCSI address and the value may be the database representation of the storage port's physical structures and characteristics. In some embodiments, an initialization structure include a map of the storage port ids to the storage port structures. In certain embodiments, an initialization structure may include a map of engine identifiers to a set of storage port structures that may be contained in that engine. In other embodiments, an initialization structure may include a map of the director or port group names to a set of storage port structures representing ports contained in each respective director. In many embodiments, an initialization structure may include a map of SAN switch names to a set of Storage Port structures that may be directly connected to the indicated switch. In various embodiments, an initialization structure may include a reverse map from storage port structure to the SAN switch name it may be directly connected to. In certain embodiments, an initialization structure may contain a set of already allocated engines that may indicate which engines were used in the allocation of ports from previous transport zones. In some embodiments, an initialization structure may include a set of already allocated directors that may indicate which directors were used in previous transport zones. In certain embodiments, an initialization structure may include a set of already used SAN switches.

As shown in FIG. 5, port provisioning system 224 uses initialization structure in determining whether each port in a connected switch is discoverable (Step 510). In many embodiments, a port may be discoverable if a port provisioning system has access to discovered data about the transport zone connectivity of the port. In various embodiments, a port may not be discoverable if the port is not active, malfunctioning, and/or disconnected from the switch or computer system. If a port is not discoverable, port provisioning system 224 eliminates the port (Step 515) from consideration. In this embodiment, port provisioning system 224 initializes internal data sets (Step 520). In many embodiments, a port provisioning system may maintain internal data structures for allocated ports, allocated engines, allocated directors, and allocated switches, which may represent ports which have been already allocated, the engines which have already been allocated, the directors which have already been allocated, and the switches which have already been allocated. Initially, each data structure is initialized to empty. In this embodiment, port provisioning system 224 sets candidate ports (Step 530) which includes available storage ports in a transport zone minus any already allocated storage ports or any ports eliminated at Step 515

Figure 6:
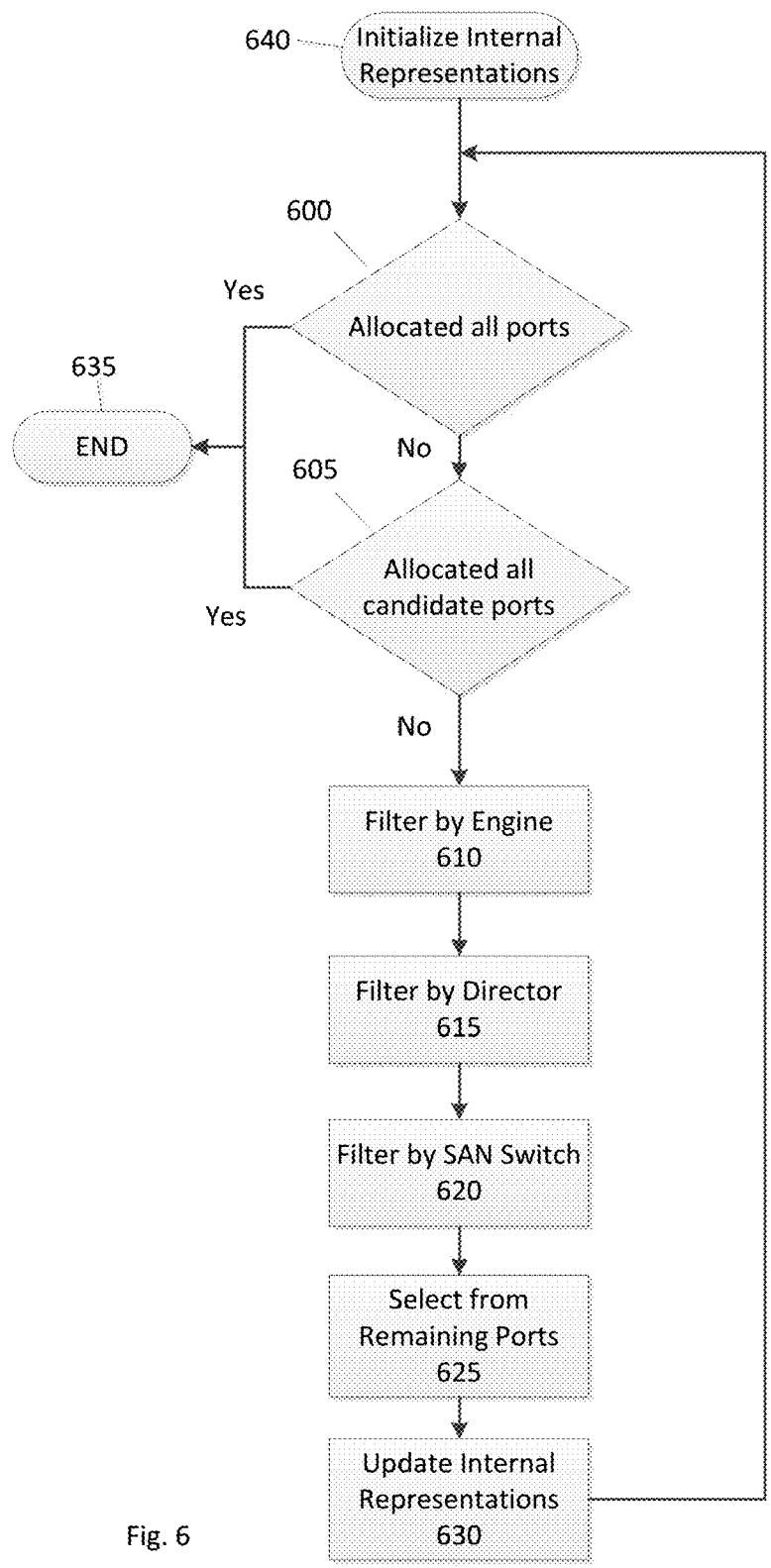
FIG. 6 is a simplified flowchart of a method of port provisioning in a data storage system, in accordance with an embodiment of the present disclosure.
Figure 7:
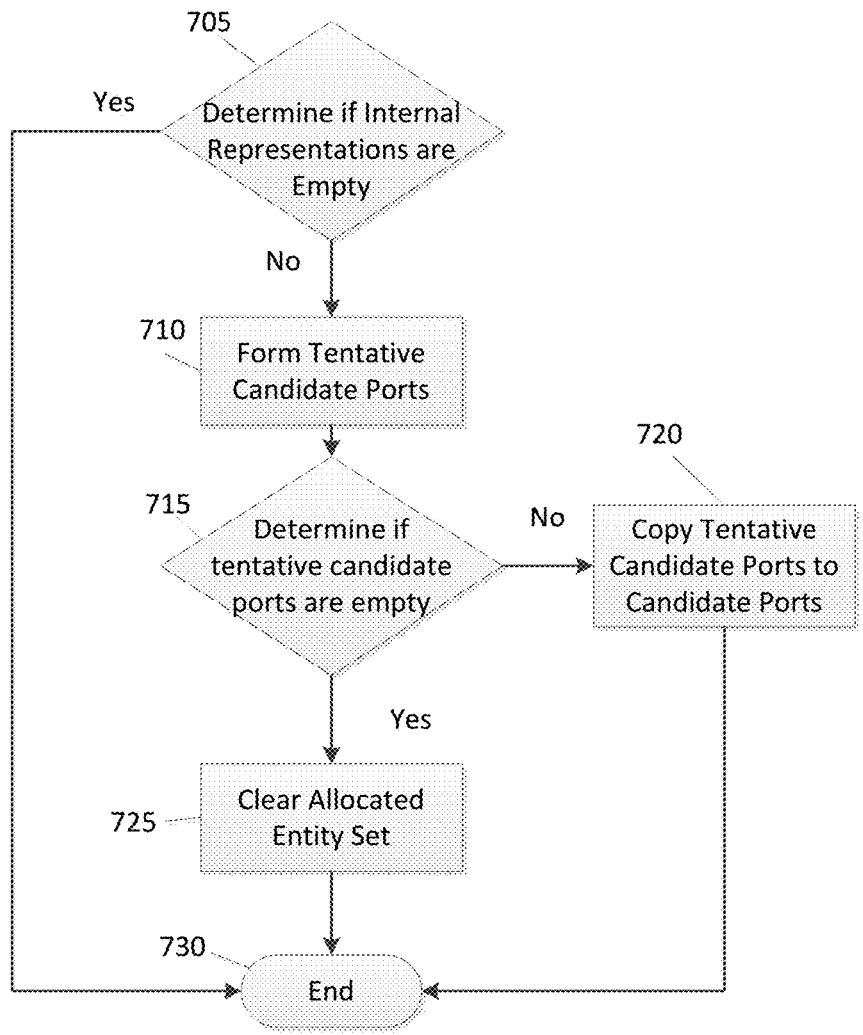
FIG. 7 is a simplified flowchart of a method of filtering ports in a port provisioning system, in accordance with an embodiment of the present disclosure.

Refer now to the example embodiments of FIGS. 2 and 6. FIG. 6 is a simplified flowchart of a method of port provisioning in a data storage system, as shown in FIG. 2, in accordance with an embodiment of the present disclosure. As shown, port provisioning system 224 initializes by initializing internal representations (Step 640) of data storage system 210 and host 221. Port provisioning system analyzes internal representations and determines if each requested data path and/or storage ports are allocated (Step 600). If each requested data path and/or storage port are allocated, port provisioning system 224 ends (Step 635). If each requested data path and/or storage ports are not allocated, port provisioning system 224 determines if each candidate port has been allocated (Step 605) If each candidate port has been allocated, port provisioning system 224 ends (Step 635). In this embodiment, if there are one or more candidate ports, port provisioning system 224 filters the candidate ports by entity (an embodiment of the Filtering algorithm is shown in FIG. 7). As shown, port provisioning system 224 filters by engine (Step 610), filters by director (Step 615), and filters by SAN Switch (Step 620). In this embodiment, each filter removes ports from the candidate list which reside on already used entities. In other embodiments, port provisioning system may be enabled to filter ports based on one or more different types of entities. In various embodiments, entities may include initiators, directors, engines, SAN Switches, and/or other hardware components with a computer system and/or a data storage system.

As shown in FIGS. 2 and 6, port provisioning system 224 selects a port from the remaining ports on the candidate port list (Step 625) and updates internal representations (Step 630) of data storage system 210 and host 212. In many embodiments, updating internal representations may include flagging which ports and/or components have been used to enable the creation of each data path from one or more hosts to one or more data volumes. Port provisioning system 224 restarts at Step 600 until an end (Step 635) is reached.

Refer now to the example embodiment of FIGS. 2 and 7. FIG. 7 is a simplified flowchart of a method of filtering ports in a port provisioning system, as shown in FIG. 2, in accordance with an embodiment of the present disclosure. As shown, port provisioning system 224 is filtering ports by entity. In this embodiment, port provisioning system 224 determines if internal representations are empty (Step 705) for the particular entity being filtered. If internal representations are empty, port provisioning system 224 ends filtering (Step 730). If internal representations are not empty, port provisioning system 224 forms a tentative list of candidate ports (Step 710).

In many embodiments, a tentative list of candidate ports may be determined based on which type of entity is being filtered. In some embodiments, a port provisioning system may calculate a tentative set of ports from the candidate ports by removing ports that belong to any of the engines in the allocated engines set. In various embodiments, a port provisioning a port provisioning system may calculate a tentative set of ports from the candidate ports by removing ports that belong to any of the directors in the allocated directors set. In certain embodiments, a port provisioning system may calculate a tentative set of ports from the candidate ports by removing ports that are connected to any of the switches in the allocated switches set.

As shown, port provisioning system 224 determines if the tentative candidate ports list is empty (Step 715). If the tentative candidate ports list is empty, port provisioning system 224 clears the current allocated entity set (Step 725) and ends filtering (Step 730). If the tentative candidate ports list is not empty, port provisioning system 224 copies the tentative candidate ports list to the candidate ports list (Step 720) and ends (Step 730). In this embodiment, port provisioning system 224 retains the results of the filtering.

Refer now to the example embodiments of FIGS. 2, 4 and 8. FIG. 8 is an example embodiment of a method of provisioning ports to enable a host to communicate with a data storage volume, as shown in FIG. 4, using a port provisioning system, as shown in FIG. 2, in accordance with an embodiment of the present disclosure. As shown, port provisioning system 224 gets inputs (Step 800) from data storage system 210 regarding configuration, host 405, and the availability of ports within data storage system 210. In this embodiment, Host 405 requests two data paths to data storage volume 420. Port provisioning system 224 analyzes inputs to determine available ports (Step 810). As shown, port provisioning system 224 method of provisioning ports is executed for each transport zone through which provisioning system 224 creates a data path. In this embodiment, port provisioning system 224 determines that Host 405 has available ports on initiator 410 and on initiator 415. Port provisioning system 224 determines transport zone 360 and transport zone 365 has available ports. Port provisioning system 224 determines that data storage array 310 has available ports on engine 315 and engine 320. Port provisioning system 224 uses configuration input to filter available ports to determine a balanced allocation of ports. In this embodiment, Port provisioning system 224 allocates available ports (Step 520) to enable host 405 to communicate with data storage volume 420.

Refer now to the example embodiments of FIGS. 2, 4 and 9. FIG. 9 is an alternate example embodiment of a method of provisioning ports to enable a host to communicate with a data storage volume, as shown in FIG. 4, using a port provisioning system, as shown in FIG. 2, in accordance with an embodiment of the present disclosure. In this embodiment, port provisioning system 224 has been invoked in data storage system 210 where host 380 has two data paths to data volume 305. As shown, port provisioning system 224 gets inputs (Step 900) from data storage system 210 regarding configuration, host 405, and the availability of ports within data storage system 210. In this embodiment, Host 405 requests three data paths to data storage volume 420. Port provisioning system 224 determines which ports are already allocated (Step 910). In this embodiment, Port provisioning system 224 filters the available ports (Step 920) to determine a balanced allocation of ports. In this embodiment, Port provisioning system 224 allocates available ports (Step 930) to enable host 405 to communicate with data storage volume 420.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 10:
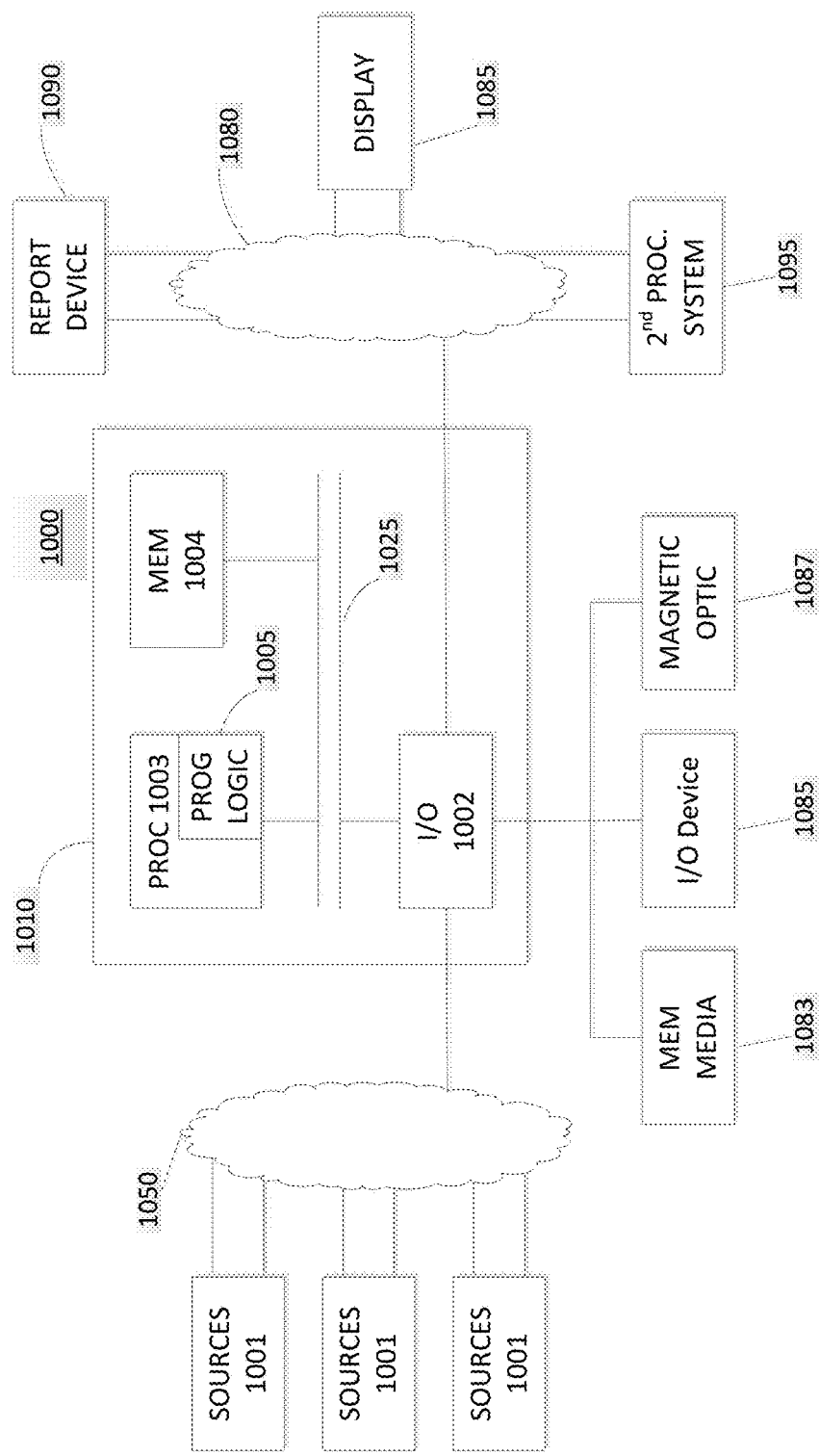
FIG. 10 is an example of an embodiment of an apparatus that may utilize the techniques described herein, in accordance with an embodiment of the present disclosure.

FIG. 10 is a block diagram illustrating an apparatus, such as a computer 1010 in a network 1000, which may utilize the techniques described herein according to an example embodiment of the present invention. The computer 1010 may include one or more I/O ports 1002, a processor 1003, and memory 1004, all of which may be connected by an interconnect 1025, such as a bus. Processor 1003 may include program logic 1005. The I/O port 1002 may provide connectivity to memory media 1083, I/O devices 1085, and drives 1087, such as magnetic or optical drives. When the program code is loaded into memory 704 and executed by the computer 1010, the machine becomes an apparatus for practicing the invention. When implemented on one or more general-purpose processors 1003, the program code combines with such a processor to provide a unique apparatus that operates analogously to specific logic circuits. As such, a general purpose digital machine can be transformed into a special purpose digital machine.

Figure 11:
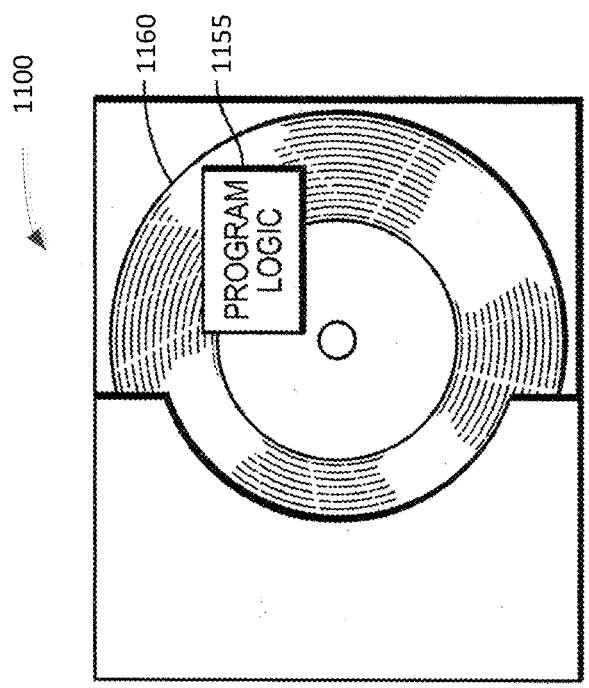
FIG. 11 is an example of a method embodied on a computer readable storage medium that may utilize the techniques described herein, in accordance with an embodiment of the present disclosure.

FIG. 11 is a block diagram illustrating a method embodied on a computer readable storage medium 1160 that may utilize the techniques described herein according to an example embodiment of the present invention. FIG. 11 shows Program Logic 1155 embodied on a computer-readable medium 1160 as shown, and wherein the Logic is encoded in computer-executable code configured for carrying out the methods of this invention and thereby forming a Computer Program Product 1100. Program Logic 1155 may be the same logic 1005 on memory 1004 loaded on processor 1003 in FIG. 10. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-11. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for allocating a plurality of available ports on a data storage system, the data storage system having a plurality of data storage volumes, to enable communication between a host and the plurality of data storage volumes on the data storage system, the computer-executable method comprising:
    receiving inputs at the data storage system for use with multiple filters for managing allocation of the plurality of available ports on the data storage system;
    filtering the plurality of available ports on the data storage system to determine a balanced allocation of the plurality of available ports accessible through a plurality of storage components on the data storage system, wherein the filtering prioritizes a port of the plurality of available ports based on hardware redundancy;
    wherein, during the filtering, the multiple filters are used to iteratively filter the plurality of available ports by use of the multiple filters which are prioritized based on entity types, wherein the entity types are an engine, a director, and a storage area network switch within the data storage system;
    wherein, during the filtering, the data storage system filters the plurality of available ports across multiple hardware redundancy groups; and
    allocating the plurality of available ports to data storage volumes of the plurality of data storage volumes thereby enabling access to the data storage volume through the plurality of storage components.

2. The computer-executable method of claim 1, wherein the plurality of storage components includes a first component and a second component, wherein each allocated port of the plurality of available ports is balanced across the first component and the second component.

3. The computer-executable method of claim 1, wherein the filtering comprises a first filter, wherein the first filter filters the plurality of available ports based on a first component of the plurality of components on the data storage system creating a set of filtered available ports.

4. The computer-executable method of claim 3, wherein the filtering further comprises a second filter, wherein the second filter filters the set of filtered available ports based on a second component of the plurality of components on the data storage system creating a second set of filtered available ports.

5. The computer-executable method of claim 1, further comprising:
   analyzing a configuration of the data storage system to determine which of the storage components to filter while filtering of the plurality of available ports on the data storage system.

6. A system, comprising:
   a data storage system having a plurality of data storage volumes; and
   computer-executable logic, encoded in memory of one or more computers in communication with the data storage system, for allocating a plurality of available ports on a data storage system to enable communication between a host and the plurality of data storage volumes, wherein the computer-executable program logic is configured for the execution of:
      receiving inputs at the data storage system for use with multiple filters for managing allocation of the plurality of available ports on the data storage system;
      filtering the plurality of available ports on the data storage system to determine a balanced allocation of the plurality of available ports accessible through a plurality of storage components on the data storage system, wherein the filtering prioritizes a port of the plurality of available ports based on hardware redundancy;
      wherein, during the filtering, the multiple filters are used to iteratively filter the plurality of available ports by use of the multiple filters which are prioritized based on entity types, wherein the entity types are an engine, a director, and a storage area network switch within the data storage system;
      wherein, during the filtering, the data storage system filters the plurality of available ports across multiple hardware redundancy groups; and
      allocating the plurality of available ports to data storage volumes of the plurality of data storage volumes thereby enabling access to the data storage volume through the plurality of storage components.

7. The system of claim 6, wherein the plurality of storage components includes a first component and a second component, wherein each allocated port of the plurality of available ports is balanced across the first component and the second component.

8. The system of claim 6, wherein the filtering comprises a first filter, wherein the first filter filters the plurality of available ports based on a first component of the plurality of components on the data storage system creating a set of filtered available ports.

9. The system of claim 8, wherein the filtering further comprises a second filter, wherein the second filter filters the set of filtered available ports based on a second component of the plurality of components on the data storage system creating a second set of filtered available ports.

10. The system of claim 6, wherein the computer-executable program logic is further configured for the execution of:
    analyzing a configuration of the data storage system to determine which of the storage components to filter while filtering of the plurality of available ports on the data storage system.

11. A computer program product for allocating a plurality of available ports on a data storage system, the data storage system having a plurality of data storage volumes, to enable communication between a host and the plurality of data storage volumes on the data storage system, the computer program product comprising:
    a non-transitory computer readable medium encoded with computer-executable program code for using read signatures in replication, the code configured to enable the execution of:
       receiving inputs at the data storage system for use with multiple filters for managing allocation of the plurality of available ports on the data storage system;
       filtering the plurality of available ports on the data storage system to determine a balanced allocation of the plurality of available ports accessible through a plurality of storage components on the data storage system, wherein the filtering prioritizes a port of the plurality of available ports based on hardware redundancy;
       wherein, during the filtering, the multiple filters are used to iteratively filter the plurality of available ports by use of the multiple filters which are prioritized based on entity types, wherein the entity types are an engine, a director, and a storage area network switch within the data storage system;
       wherein, during the filtering, the data storage system filters the plurality of available ports across multiple hardware redundancy groups; and
       allocating the plurality of available ports to data storage volumes of the plurality of data storage volumes thereby enabling access to the data storage volume through the plurality of storage components.

12. The computer program product of claim 11, wherein the plurality of storage components includes a first component and a second component, wherein each allocated port of the plurality of available ports is balanced across the first component and the second component.

13. The computer program product of claim 11, wherein the filtering comprises a first filter, wherein the first filter filters the plurality of available ports based on a first component of the plurality of components on the data storage system creating a set of filtered available ports.

14. The computer program product of claim 13, wherein the filtering further comprises a second filter, wherein the second filter filters the set of filtered available ports based on a second component of the plurality of components on the data storage system creating a second set of filtered available ports.

15. The computer program product of claim 11, wherein the code configured to further enable the execution of:
    analyzing a configuration of the data storage system to determine which of the storage components to filter while filtering of the plurality of available ports on the data storage system.

\* \* \* \* \*